United States Patent [19]

Deming et al.

[11] 3,926,330
[45] Dec. 16, 1975

[54] KNOCKOUT ARRANGEMENT FOR MOLDED PLASTIC ELECTRICAL BOXES

[75] Inventors: Dale R. Deming; Arthur E. Datschefski, both of South Bend, Ind.

[73] Assignee: All-Steel Inc., Aurora, Ill.

[22] Filed: Mar. 13, 1974

[21] Appl. No.: 450,851

[52] U.S. Cl.................. 220/3.9; 174/58; 174/65 R; 220/266
[51] Int. Cl.² ......................................... H02G 3/12
[58] Field of Search .......................... 220/3.2–3.94, 220/265, 266; 174/51, 53, 58, 60, 64, 65 R

[56] References Cited
UNITED STATES PATENTS

| | | | |
|---|---|---|---|
| 1,974,268 | 9/1934 | Givens | 220/3.2 |
| 2,113,918 | 4/1938 | Kettron | 220/3.2 |
| 2,197,737 | 4/1940 | Appleton | 220/3.2 |
| 2,867,349 | 1/1959 | Parker | 220/3.3 |
| 2,959,633 | 11/1960 | Palmer et al. | 220/3.2 X |
| 3,112,938 | 12/1963 | Karlin | 174/65 R X |
| 3,119,895 | 1/1964 | Palmer | 220/3.2 X |
| 3,701,451 | 10/1972 | Schindler et al. | 220/3.9 X |
| 3,770,873 | 11/1973 | Brown | 174/58 |
| 3,773,968 | 11/1973 | Copp | 220/3.9 X |
| 3,783,176 | 1/1974 | Lund et al. | 174/65 R |

Primary Examiner—William I. Price
Assistant Examiner—Stephen Marcus
Attorney, Agent, or Firm—Mann, Brown, McWilliams & Bradway

[57] ABSTRACT

A knockout arrangement for molded plastic electric wiring boxes in which the box is molded to define, at the juncture of the box side walls and back wall, and in conjunction with one or more of the box side walls, a corner segment having a pair of integral leaf portions of which one of the leaf portions is integral with the box side wall and the other leaf portion is integral with the box back wall. The respective segment leaf portions are offset inwardly into the chamber that is defined by the box, but are connected to the box wall each is associated with by an integral frangible marginal portion of film thickness proportions, which form a frangible marginal portion about the corner segment that is continuous and uninterrupted. The knockout formed by the corner segment can be removed by applying a screw driver or the like against same from either the inside or the outside of the box to push the corner segment out of its position in the box to define the knockout opening that is to receive a cable end to be inserted in the box.

4 Claims, 14 Drawing Figures

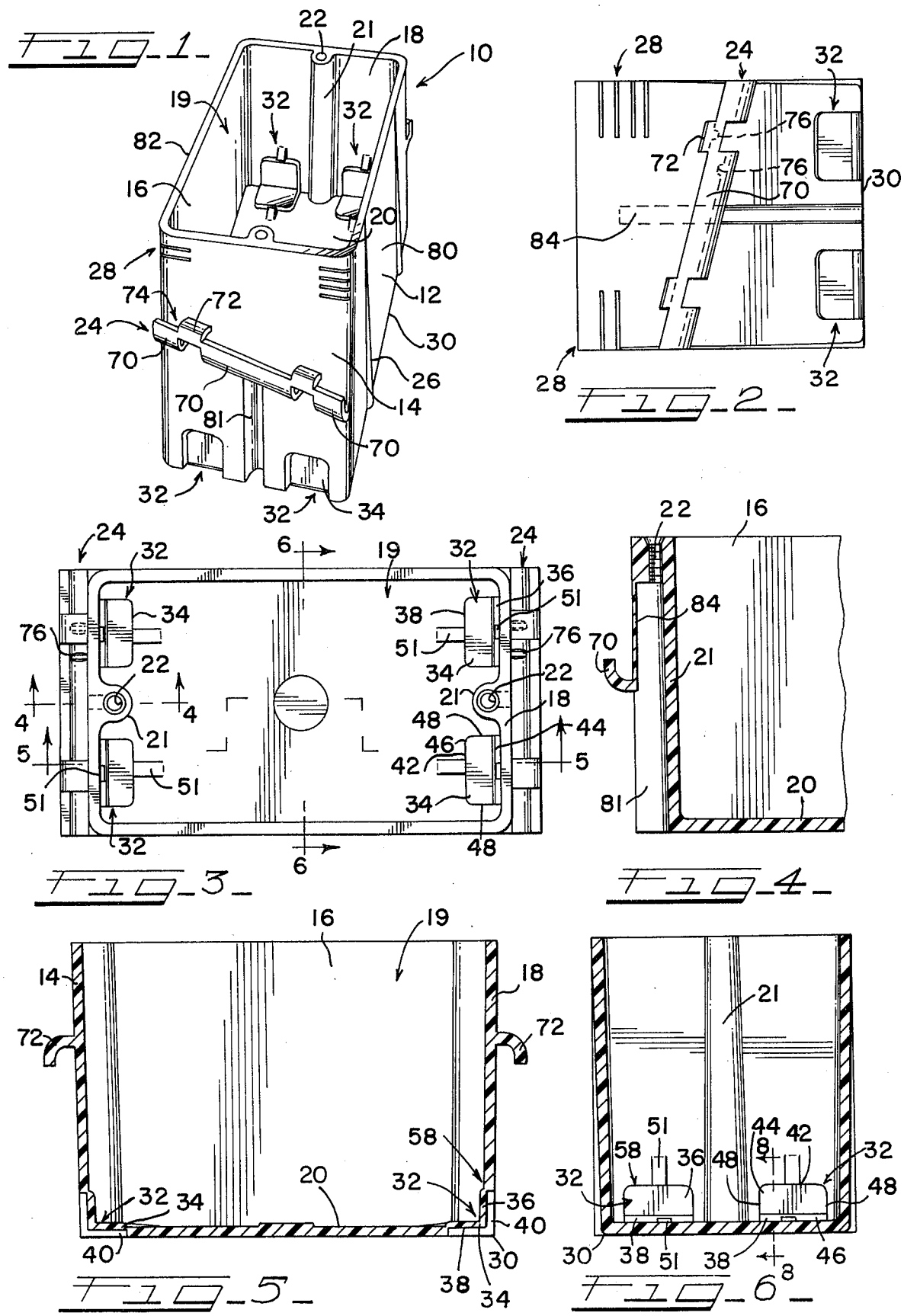

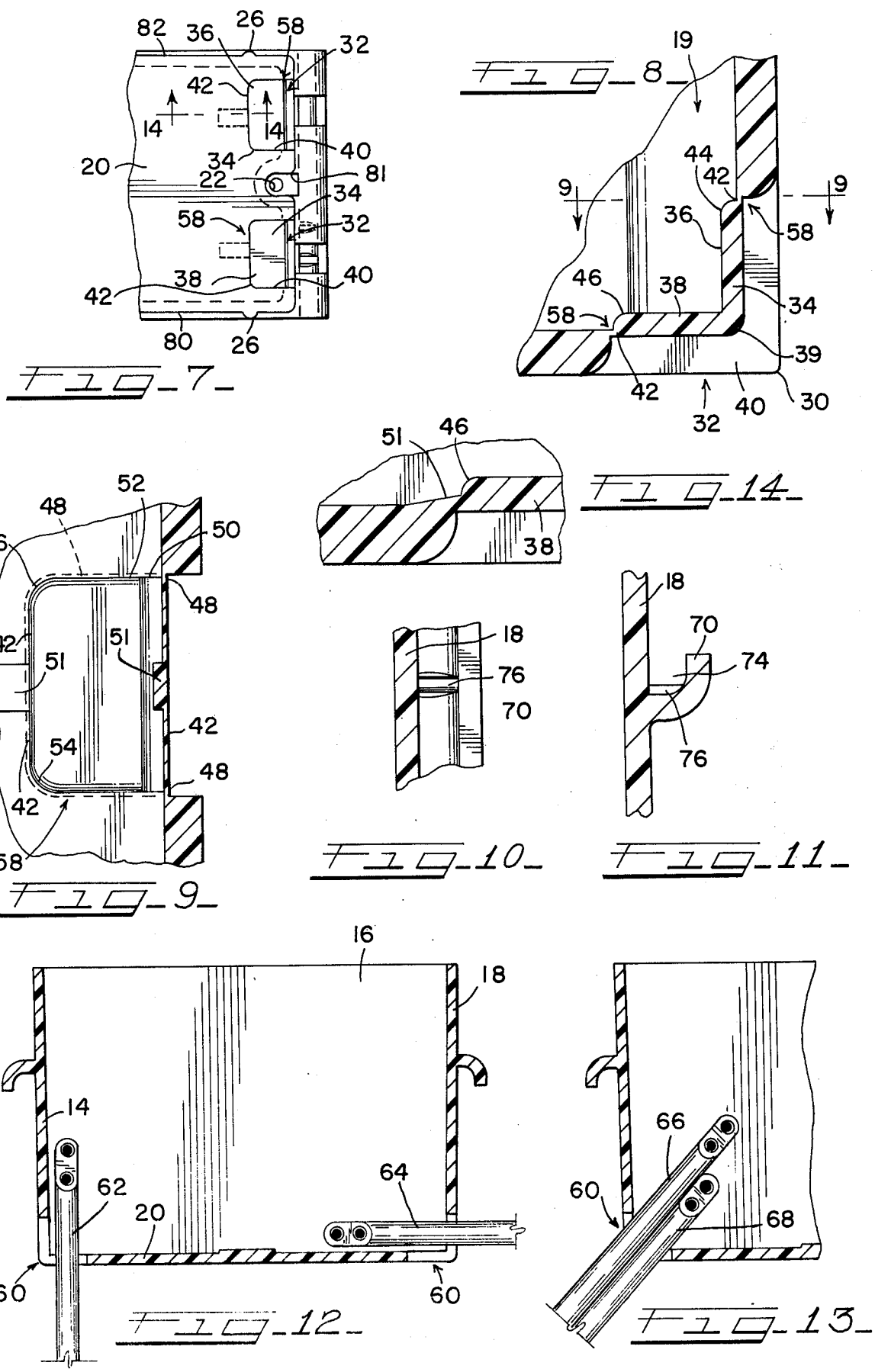

KNOCKOUT ARRANGEMENT FOR MOLDED PLASTIC ELECTRICAL BOXES

This invention relates to a knockout arrangement for molded plastic electrical wiring boxes, and more particularly, to a knockout arrangement for plastic electric boxes that is particularly adapted for use in connection with non-metallic sheathed cable.

Knockout arrangements for electrical boxes are customarily in the form of a box knockout portion that is an integral part of the box side or back wall, but which is frangibly connected thereto in a manner to put ready separation of the knockout portions from the box to define the knockout opening that receives the electrical wiring end that is to be connected to electrical devices or other wiring within the box. However, conventionally arranged knockout openings for box side walls accommodate only cable entrance from the side of the box, and conventional knockout arrangements for box rear walls accommodate only cable entrance from the rear of the box.

Furthermore, existing knockout arrangements for molded plastic boxes are formed to be knocked out from the outside of the box. Once the box is mounted in construction and the area of the box is completed, it is frequently difficult if not impossible for the electrician to obtain access to the outside of the box without cutting the adjacent building wall structure away.

A principal object of this invention is to provide a knockout arrangement for molded plastic boxes that permits removal of the knockout from either inside or outside of the box.

Another principal object of the invention is to provide a knockout arrangement for molded plastic boxes which permit the same knockout opening to accommodate cables from the side or back of the box, or at a diagonal position relative to the rear of the box.

Other objects of the invention are to provide a knockout arrangement for molded plastic boxes that permits the knockout to be pushed out of position from either the inside or the outside of the box by pressing against same with a screw driver or the like, to provide a knockout arrangement that is readily adapted for molding procedures, and in general provide a molded box arrangement that is economical of manufacture, convenient to use, and long lived in application.

In accordance with this invention, the knockout is provided at the juncture of the box side and rear walls in the form of a corner segment comprising a pair of integrally united leaf portions, one leaf portion being integral with the box side wall and the other leaf portion being integral with the box back wall. The corner segment leaf portions are each connected to their respective box walls by frangible marginal portions that are integrally connected together at the apex or corner of the segment to form a continuous and uninterrupted marginal portion about the corner segment that is readily fractured for ease of removal of the knockout.

The corner segment is indented or offset inwardly of the box a dimension equivalent to the thickness of the respective leaf portions minum the thickness of the indicated frangible connecting portions. The knockout forming corner segment can be readily removed from either the inside or the outside of the box by pressing against same with a suitable hand tool such as a screw driver. The corner segment leaf portions each have a marginal outline that is generally similar to the outline of the transverse section of the cable for close fitting relation to the cable when the cable end is inserted in the box through the knockout opening formed by removing the knockout.

On removal of the knockout, which, as indicated, may be effected by utilizing a screw driver or the like to push the knockout out of the box from either the inside or the outside of the box, the cable end may be brought into the box through the resulting knockout opening from either the side or the back of the box even though only a single knockout opening is formed by removing the knockout in question. In either of these applications, the cable substantially fills the knockout opening due to the proportioning of the parts involved. In addition, two cables in side by side relation may be inserted into the box through the knockout opening by being disposed diagonally of the knockout opening. Again, the shape of the knockout is such that the abutting cables substantially close the knockout openings.

The knockout arrangement of this invention may be applied to boxes that are round as well as quadrilateral in configuration, and may be applied at any suitable location along the back marginal corner edge of the box; of course, the box may be provided with any number of the knockouts that would be appropriate, in accordance with standard practices, for the size, type and shape of box in question.

Other objects, uses and advantages will be obvious or become apparent from a consideration of the following detailed description and the application drawings.

In the drawings:

FIG. 1 is a diagrammatic perspective view illustrating a plastic molded box in which the invention is incorporated;

FIG. 2 is an end view of the box shown in FIG. 1;

FIG. 3 is a plan view of the box shown in FIG. 1;

FIG. 4 is a fragmental sectional view taken substantially along line 4—4 of FIG. 3;

FIG. 5 is a cross-sectional view taken substantially along lines 5—5 of FIG. 3;

FIG. 6 is a cross-sectional view taken substantially along line 6—6 of FIG. 3;

FIG. 7 is a bottom view of one end of the box shown in FIG. 1;

FIG. 8 is a fragmental cross-sectional view taken substantially along line 8—8 of FIG. 6, but on an enlarged scale;

FIG. 9 is a fragmental cross-sectional view taken substantially along line 9—9 of FIG. 8;

FIGS. 10 and 11 are diagrammatic fragmental sectional views illustrating details of construction;

FIG. 12 is similar to FIG. 5 but illustrates in phantom two ways in which cable ends may be applied to the box;

FIG. 13 is a view similar to that of FIG. 12 illustrating another way cable ends may be applied to the box; and FIG. 14 is a fragmental sectional view similar to that of FIG. 8 illustrating the knockout splines that assist in performing the box molding operations.

However, it is to be understood that the specific drawing illustrations provided are supplied primarily to comply with the requirements of the Patent Laws, and that the invention is susceptible of other embodiments which will be obvious to those skilled in the art, and which are intended to be covered by the appended claims.

GENERAL DESCRIPTION

Reference numeral 10 of FIG. 1 generally indicates a molded plastic box in which the invention is incorporated, and which generally comprises the usual side walls 12, 14, 16 and 18 and rear or back wall 20 integrally united and shaped to define the box shape desired and cavity of chamber 19 to house the wiring, which in the form shown are of rectangular outline. Side walls 14 and 18, which may also be considered the end walls of the box, are each formed with a ridge or lug 21 each having the usual screw receiving opening 22 to mount a switch or the like in operative position at the front of the box.

The particular box 10 that is shown defines nail receiving sockets or passages 24 at either end of same, a pair of runner ribs 26 on each side wall 12 and 16, and appropriate gauge marks where indicated at 28.

The nature of the box 10 is such that its side walls 12, 14, 16 and 18 merge with the back or rear wall 20 to define a back or rear corner edging 30 that defines the general outline of the back of the box.

In accordance with this invention, the box 10 is provided with the novel knockout arrangement indicated at 32 which, in the form shown, involves a pair of knockout arrangements 32 formed in the respective end walls 14 and 18, as indicated in the drawings. However, all the knockouts 32 are the same in arrangement and a description of one will serve as a description of all.

The individual knockout arrangements 32 each generally comprises a corner segment 34 located at the rear corner edge 30 of the box and defining a pair of leaf portions 36 and 38 which are integrally united at the segment corner or apex 39. The leaf portions 36 and 38 each have the general outline indicated in the drawings which is roughly comparable to the outline of the transverse cross-sectional outline of non-metallic sheathed cable in block diagram form.

As indicated in FIGS. 8 and 9, each corner segment and its leaf portions 36 and 38 are recessed or indented within the box side and rear wall involved to define a right angle knockout recess 40 exposing the knockout corner segment 34, from the side and from the back of the box, or from the rear corner edge of the box at which the knockout is located. The recessing or indenting of the knockout protects same from accidental dislodgement during handling of the box, for packaging purposes or otherwise.

The leaf portions 36 and 38 are offset or indented into the chamber 19 of the box, as indicated in FIG. 8, and the respective leaf portions are integral with the respective box walls by connecting frangible edge portions 42 along the ends 44 and 46 of the respective segment leaf portions, and frangible edge portions 48 along the sides 50 and 52 (see FIG. 9) of the respective leaf portions 36 and 38 of the segment 34. Also formed along the ends 44 and 46 of the respective segment leaf portions are the respective splines or ribs 51 that are angular in longitudinal section (they taper at an angle of approximately 10° in the form shown), which augment the thickness of edge portions 42 somewhat, but have the principal function of aiding in the molding of the box to provide for uniform flow of the molding material, through the molding space they represent, into the space that defines the respective leaf portions 36 and 38.

The frangible edge portions 42 and 48 are integrally connected at the corners 54 and 56 of the corner segment leaf portions to define a corner segment marginal edge portion 58 which is continuous and uninterrupted about the corner segment 34 and integral with the adjacent side and back walls of the box. As per Underwriter Laboratory's regulations, the marginal edge portion 58 has sufficient strength to meet Underwriter Laboratory's knockout test as described in their standard U/L514, but fractures with application of such forces exceeding that level.

As indicated in FIGS. 8 and 9, the segment 34 is offset or indented into the chamber 19 of the box a dimension equivalent to the thickness of the respective segment leaf portions 36 and 38 minus the thickness of the frangible connecting portions 42 and 48 (the dimensions of the latter being identical about the rear edging 30 of the corner segment 34).

The knockout arrangement 32 is located and shaped so that it can be pressed out of its location in the box from either the inside or the outside of the box, and with equal facility. This may be done by pressing against same with the working end of a flat bladed tool, such as a screw driver or chisel to fracture the connecting portions 42 and 48, whereby the corner segment 34 will be separated as a whole from the box to leave a corner located knockout opening 60 of the special significance indicated in FIGS. 12 and 13.

In removing the knockout from the inside of the box, the working end of the flat bladed tool is pressed or tapped with a hammer against the inside of the knockout apex 39 to fracture edge portion 58. Removal from outside the box is affected by pressing or tapping the tool against the outside of the knockout apex 39 or against the marginal edge of one of the knockout leaf portions.

As indicated in FIG. 12, the knockout opening 60 is adapted to receive a cable end 62 from the back or rear or the box, or a cable end 64 from one side of the box, for wiring purposes. The opening 60 is proportioned so that when the cable ends 62 and 64 are inserted into the box, they substantially fill the knockout openings 60 provided.

Alternately, the same knockout opening 60 may also be employed to receive two cables 66 and 68 one on top of the other and disposed in a diagonal manner relative to the rear corner of the box in which the outlet opening 60 is located, with the pair of cables so applied substantially filling the knockout opening in question. The cables 62, 64, 66 and 68 shown diagrammatically are intended to represent standard non-metallic sheathed cable.

It will be appreciated that the two way removal available for forming the knockout opening 60 by removing a knockout 32 is of special importance in the electrical field. When working on new construction it is a relatively easy matter to remove a knockout by working from the outside of the box because the box still remains exposed, but once the box has been made fast in its mounted position, and construction about it completed with the wiring applied thereto, it is impossible to again have access to the box knockout from outside of the box, for rewiring purposes, without cutting away the building wall structure adjacent the box.

However, with the knockout arrangement of this invention, the knockouts may be readily pressed out of the box by applying a screw driver or the like against them from inside or the box to provide the knockout opening 60 that is desired.

SPECIFIC DESCRIPTION

The box 10 may be formed from any suitable material, that being shown being formed from a suitable thermoplastic material, by injection molding methods, one example of which is the modified ABS plastic Marbon KJB, made by Marbon Chemical Company, a division of Borg Warner Corporation. Another suitable material is General Electric Company's Noryl product. Moreover, the invention is fully applicable to circular and square boxes as well as rectangular boxes.

While the corner segment leaf portions may be of any suitable thickness, the frangible connecting portions are preferably on the order of 0.005 inch in thickness and have a length dimension in the plane of the respective leaf portions on the order of 0.010 inch. As indicated, the leaf portions 36 and 38 of the corner segment are in right angled relation following the right angled positioning of the box side walls with the box rear wall.

In the specific box arrangement illustrated, the nail receiving sockets or passages 24 each comprise a plurality of forwardly angled flanges 70 that are disposed in opposed relation to rearwardly angled flanges 72 to define nail receiving recess 74 and that are proportioned and united so that between the side walls 12 and 16 of the box the respective passages 24 are continuous and uninterrupted (though they are open in an alternate manner on either side of same due to the alternate positioning of the flanges 70 and 72). As indicated in FIGS. 2, 10 and 11, certain of the flanges 70 and 72 may be formed with spaced bore restricting lugs 76 that are proportioned to make binding engagement with the nail inserted in the recess 74. The flanges 70 and 72 are disposed to set the nail receiving passage at an acute angle with respect to the box rear wall to permit easier access to the nails disposed therein for nailing the box to a building frame member. Side walls 14 and 18 being indented as at 81 for material savings purposes, the continuous nature of the passages 24 provided by the end to end connection of the flanges 70 and 72, prevents overhammering of the box nails, when mounting the box in position, from folding or collapsing the box side walls 14 and 18 at the indentations 81.

In the specific box illustrated, the outer surfaces 80 and 82 of the respective side walls 12 and 16 converge in the direction of the rear wall of the box to facilitate removal of the box from the mold, and runners 26 are provided and shaped so that the box will set squarely against the support member to which it is attached. Indentation 81 between the under side of screw opening 22 and the nail receiving sockets 24 is covered by wall portion 84 to shield or cover any portion of the switch securement screws (not shown) that project through screw receiving openings 22.

It will therefore be seen that this invention provides a simple but effective knockout arrangement which not only permits the knockout to be removed from either the inside or the outside of the box, but also permits cable ends to be inserted through the same knockout opening from the back of the box, from one side of the box, or diagonally of the box from the rear side of same. The knockout is proportioned in outline so that when the cable ends are inserted into the box through the knockout openings, the cable substantially fills the knockout opening.

The foregoing description and drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In a plastic molded electrical wiring box for use with a non-metallic, sheathed cable, wherein one end of the cable is to be received in the box, with the box including a side wall structure integrally connected to a back wall, with the side and back wall structures defining a chamber within the box that is open at the front of the box, and the side and back wall structures merging at a marginal corner about the rear of the box, a knockout arrangement therefor through which the cable end is to extend into the box, said knockout arrangement comprising:

a corner segment at said marginal corner comprising a first leaf integral with the side wall structure and a second leaf integral with the back wall structure, said leaves being integral with each other and being respectively offset within said chamber and inwardly of their respective wall structures and said marginal corners, and being integrally connected to the respective wall structures by marginal portions of film thickness proportions, said leaves merging into each other at their adjacent ends adjacent but spaced from and inwardly of said marginal corner and having their respective opposite ends extend away from their respective adjacent ends, said leaves being respectively offset within said chamber a distance equivalent to their respective thicknesses minus the thickness of their respective marginal portions, said marginal portions being integral with each other and defining about said corner segment a marginal edge portion that is continuous and uninterrupted about said corner segment and that is indented into the box and integrally connects said corner segment with said wall structures in a continuous and uninterrupted manner thereabout, with each corner segment leaf having a tapered molding spline integral with said opposite end of same and with the box wall adjacent same on the inside of the box, with said splines respectively being tapered to increase in thickness in the direction of the respective leaf opposite ends, said leaves being identical in outline configuration, whereby said corner segment as a whole is recessed within the box and is thereby protected from accidental dislodgement, and said corner segment may be removed from the box to form a knockout opening therein by fracturing said marginal edge portion utilizing a hand tool from either inside or outside the box, and the cable end may be inserted into the box chamber through the knockout opening from either the side or the back of the box in normal relation thereto.

2. The knockout arrangement set forth in claim 1 wherein:

said leaf marginal portions have a thickness of approximately 0.005 inch.

3. The knockout arrangement set forth in claim 1 wherein:

the box has formed integrally therewith on each of a pair of opposed sidewalls thereof a nail receiving passage extending continuously across same for protecting the box from overhammering of nails received in the respective passages.

4. In a plastic molded electrical wiring box in combination with a non-metallic, sheathed cable, that is to have one end of same received in the box with the box including a side wall structure integrally connected to a back wall structure, with the side and back wall structures defining a chamber within the box that is open at the front of the box, and the side and back wall structures merging at a marginal corner about the rear of the box, and a knockout arrangement therefor through which the cable end is to extend into the box, said knockout arrangement comprising:

a corner segment at said marginal corner comprising a first leaf integral with the side wall structure and a second leaf integral with the back wall structure, said leaves being integral with each other and being respectively offset within said chamber and inwardly of their respective wall structures and said marginal corner, and being integrally connected to the respective wall structures by marginal portions of film thickness proportions, said leaves each having a marginal outline, approximately the general transverse cross-sectional marginal outline of the cable end, said leaves merging into each other at their adjacent ends adjacent to but spaced from and inwardly of said marginal corner and having their respective opposite ends extend away from their respective adjacent ends, said leaves being respectively offset within said chamber a distance equivalent to their respective thicknesses minus the thickness of their respective marginal portions, said marginal portions being integral with each other and defining about said corner segment a marginal edge portion that is continuous and uninterrupted about said corner segment and that is indented into the box and integrally connects said corner segment with said wall structures in a continuous and uninterrupted manner thereabout, with each corner segment leaf having a tapered molding spline integral with said opposite end of same and with the box wall adjacent same on the inside of the box, with said splines respectively being tapered to increase in thickness in the direction of the respective leaf opposite ends, said leaves being identical in outline configuration, whereby said corner segment as a whole is recessed within the box and protected from accidental dislodgement therefrom, and said corner segment may be removed from the box to form a knockout opening therein by fracturing said marginal edge portion utilizing a hand tool from either inside or outside the box, and the cable end may be inserted into the box chamber through the knockout opening from either the side or the back of the box in normal relation thereto and substantially fill the knockout opening.

\* \* \* \* \*